INVENTOR.
ANDREW ONEAL
CHARLES E. GRAY
BY  JOHN F. MORGAN

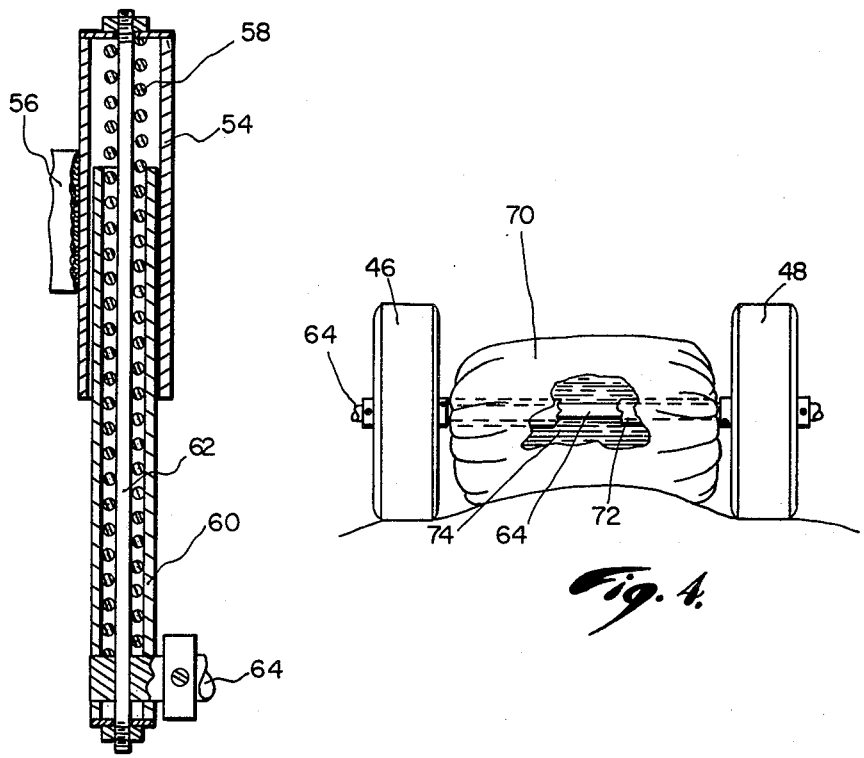

3,184,889
PLASTIC MULCH LAYING MACHINE
Charles E. Gray, Tolleson, John F. Morgan, Phoenix, and Andrew O'Neal, Glendale, Ariz., assignors, by mesne assignments, to Union Carbide Corporation, a corporation of New York
Filed Nov. 23, 1962, Ser. No. 239,429
4 Claims. (Cl. 47—9)

This invention relates to a plastic mulch laying machine and more particularly to a plastic mulch laying machine for use in laying strips of plastic material over plant rows of soil in order to shorten the growing time of plants and to prevent the escape of moisture from the soil in the plant rows.

It has been found that when a plastic strip or plastic mulch cover has been placed over a plant row of soil that the heat of the sun passes through the plastic mulch and is retained in the soil thereby raising the mean effective temperature of the soil throughout the day and night and further, that this mulch prevents the escape of moisture from the plant row of soil whereby early germination of seeds may occur and whereby rapid growth of the plants may be promoted so that plants which grow upwardly through openings pierced in the plastic mulch will mature and produce crops in a very short period of time.

The foregoing short time required for the growth of plants permits maturity of the plants following a late planting to avoid frost. Additionally, greater production from such plants grown in this manner has been apparent.

Various problems have been encountered in the proper laying of plastic mulch covers over plant rows of soil. One adverse condition caused by prior art practice in laying such mulch covers over soil has arisen through the vertical spacing of the mulch cover relative to the soil in which a plant grows.

After the mulch cover has been laid above the soil, it is pierced and seeds are planted directly below the pierced openings in the mulch cover whereupon plants may germinate and subsequently grow upwardly through the openings. When the mulch cover is laid in a conventional manner to be spaced above the soil and during hot weather, the plant which emerges from the soil must grow upwardly between the soil and the mulch cover before it may emerge through the pierced opening in the mulch cover.

During this growing period, the tender shoot of the plant during the middle of the day, is under high temperature conditions between the soil and the mulch cover and is sometimes killed in this manner.

Additionally, some difficulties are encountered in planting through mulch covers which are spaced above the upper surface of the plant row of soil. This is evident when the planting needles must pierce the plastic mulch cover above the area in which seeds are planted and when the mulch cover is disposed above the soil, it tends to deflect and stretch and cling to the needles as they are moved progressively longitudinally of the plant row of soil.

Accordingly, it is an object of the present invention to provide a plastic mulch laying machine wherein a plastic mulch cover is laid in contiguous relationship with the upper surface of a plant row of soil in order to prevent a hot space between the soil and the mulch cover through which a plant must grow on its way upward to emerge through a pierced opening in the plastic mulch cover.

Another object of the invention is to provide a plastic mulch laying machine wherein plant rows of soil are provided with a convex surface transversely thereof and whereby the mulch cover is stretched over the convex surface to maintain it contiguous with the middle of a plant row of soil so that contact of the plastic mulch cover with the soil is attained thereby preventing the formation of a space between the soil and the cover through which a plant must grow on its way to emerge through the opening in the plastic mulch cover.

Another object of the invention is to provide a plastic mulch laying machine wherein a plastic mulch cover is drawn tightly over a convex surface of a plant row of soil so that actual thermal contact and thermal conduction may occur between the plastic mulch cover and the soil in order to increase or enhance the thermal conditions of the soil during the early germination or growing period of seeds and young plants planted below the plastic mulch cover.

Another object of the invention is to provide a novel means for providing a transverse convex upper surface on a plant row of soil and for stretching and securing a plastic mulch cover thereover so that the plastic mulch cover is contiguous and in contact with the upper surface of the soil.

Another object of the invention is to provide a plastic mulch laying machine which may completely be supported and operated in connection with a conventional three-point tool bar on a tractor or other similar towing vehicle.

Another object of the invention is to provide a novel plastic mulch laying machine utilizing a flexible weighted roller to attain uniform pressure on a strip of plastic being laid on the soil in order to force the plastic into uniform contiguous engagement with the soil and over a convex surface in the soil provided by a plow which precedes the laying of the plastic and plows a transverse upwardly directed convex surface of a plant row of soil.

Other objects and advantages of the invention may be apparent from the following specification, appended claims, and accompanying drawings, in which:

FIG. 4 is a view of a modified structure of the invention comprising a flexible weighted roller for use in forcing a plastic strip into contiguous relationship with the upper surface of soil and rotated to be ground driven between plastic hold down wheels of the invention; and FIG. 5 is an enlarged fragmentary sectional view taken from the line 5—5 of FIG. 1.

Figure 1:
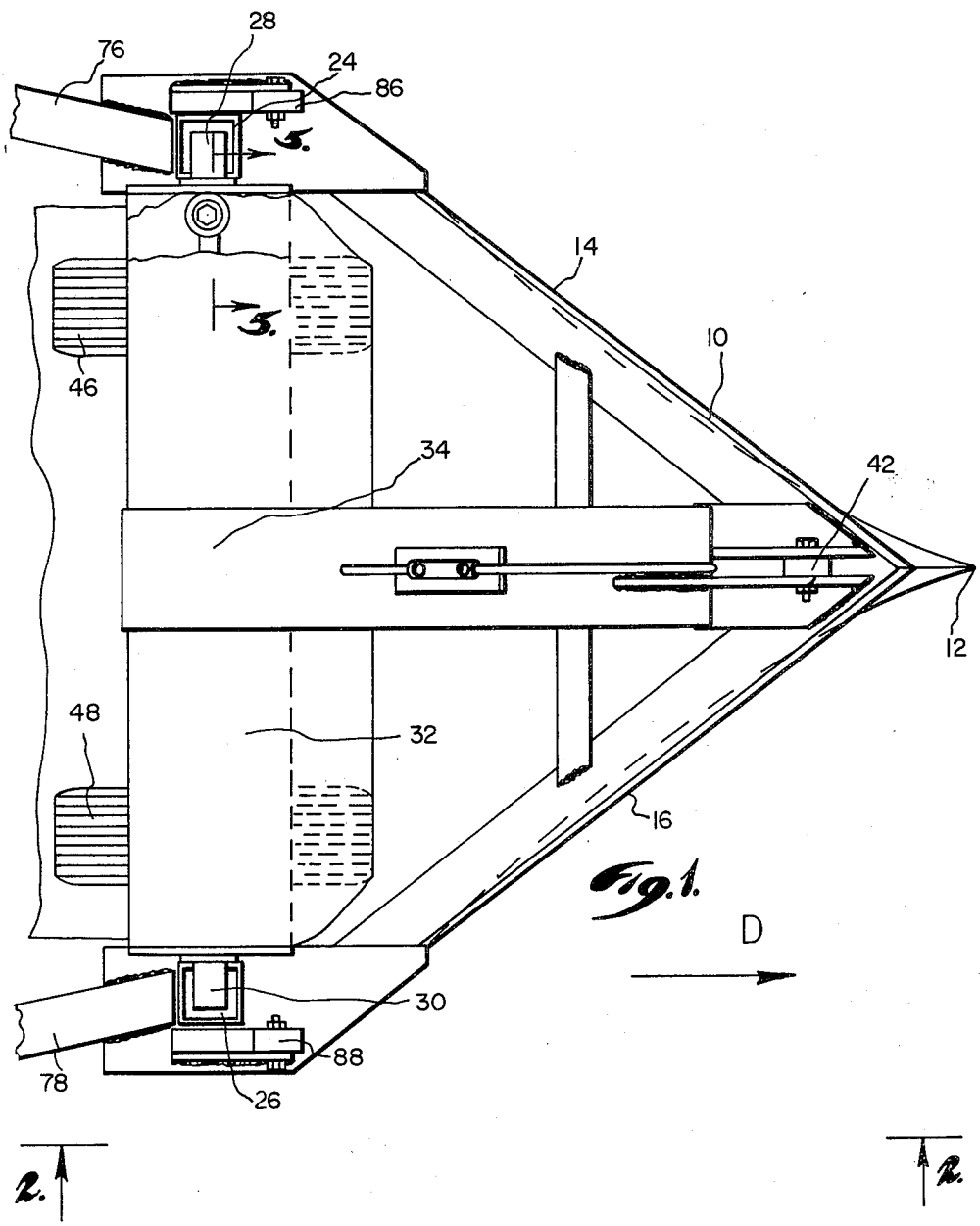
FIG. 1 is a fragmentary top or plan view of a plastic mulch laying machine, in accordance with the present invention.

In the plan view of the plastic laying machine, as shown in FIG. 1 of the drawings, a substantially V-shaped plow 10 is provided with a forwardly directed point 12 and rearwardly diverging blade portions 14 and 16. These blade portions, at their lower edges, as shown in FIG. 3 of the drawings, diverge backwardly from a central portion 18, at the point 12, in an outwardly curved direction, the blade 14 having a lower edge 20 and the blade 16 having a lower edge 22, all as shown best in FIG. 3 of the drawings. It will be seen that these lower edges 20 and 22 diverge backwardly from the point 12 at a lower edge 18 thereof. Also these blades curve outwardly and downwardly in order to form or plow a convex curved surface extending laterally of a plant row of soil in order that a strip of plastic material may be laid over a convex surface, as indicated by broken lines A, in FIG. 3 of the drawings, said convex surface being the soil plowed by the lower edge portions 18, 20, and 22 of the plow, shown in FIGS. 1 and 2 of the drawings.

Carried by bearings 24 and 26, near the upper rear edges of the blades 14 and 16, are respective trunnions 28 and 30 of a mandrel on which a roll of plastic material 32 is rotatably carried. This plastic material is very thin and may be impregnated with carbon black or other materail which is designed to absorb heat and transmit such heat to the soil therebelow.

Figure 2:
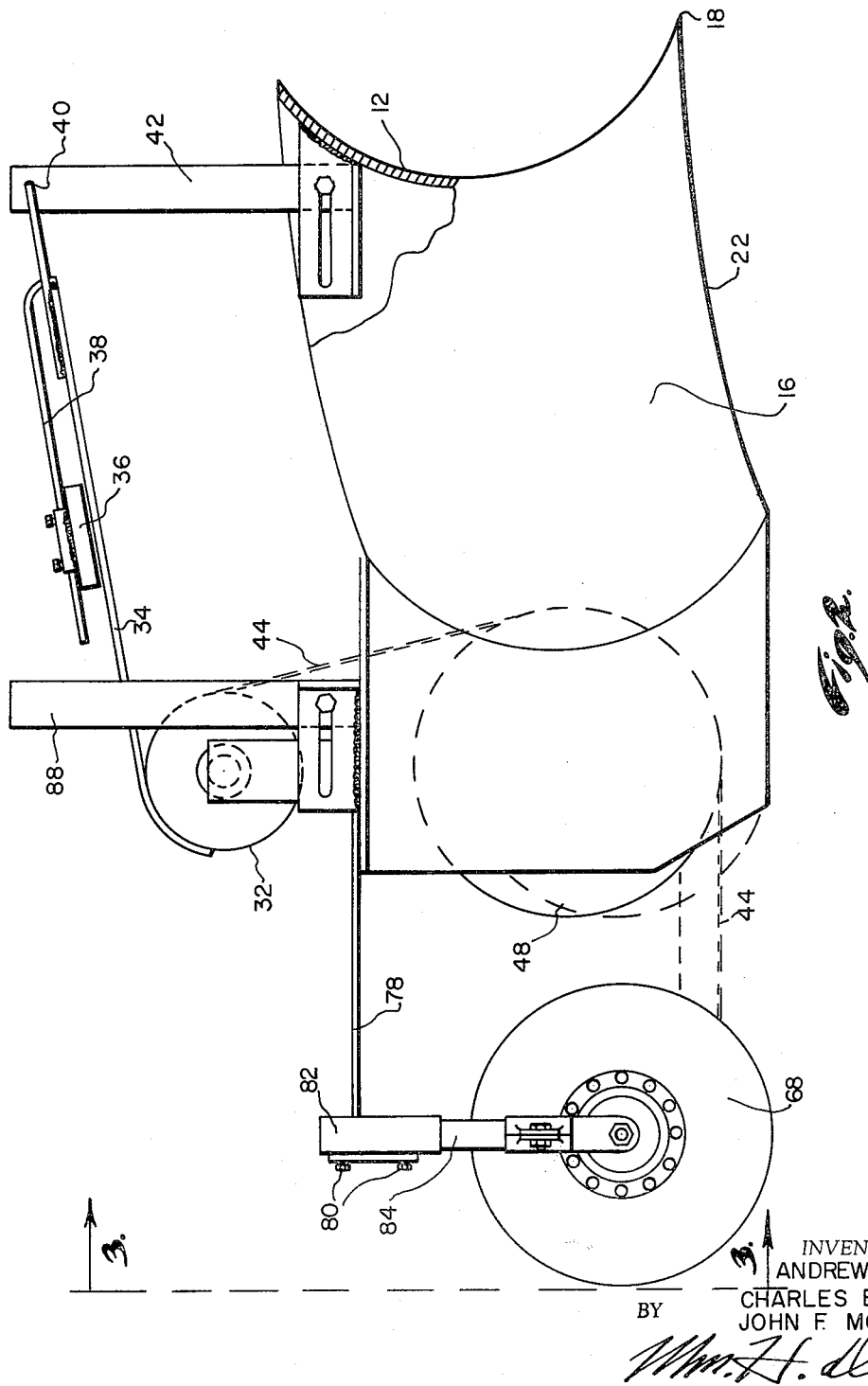
FIG. 2 is a side elevational view thereof taken from the line 2—2 of FIG. 1 showing portions broken away and in section to amplify the illustration.
Figure 3:
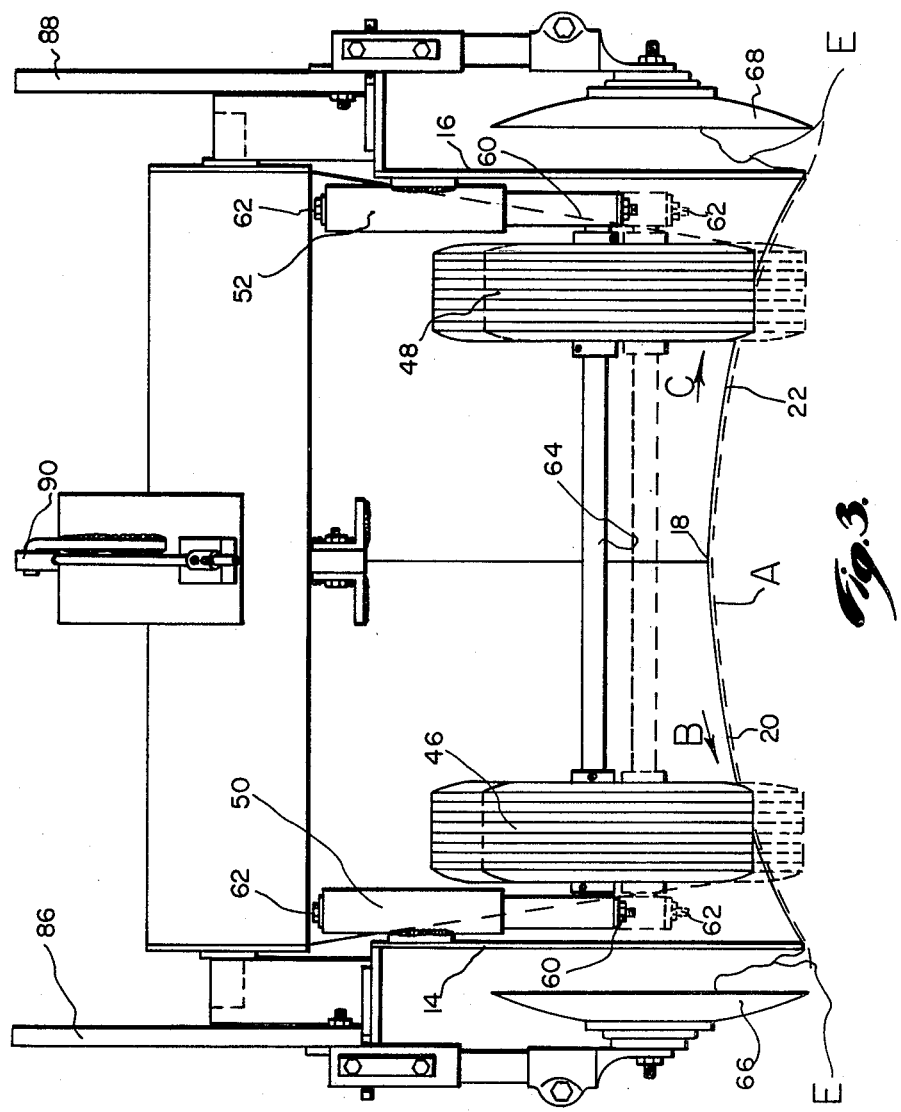
FIG. 3 is a rear view taken from the line 3—3 of FIG. 2 showing the plastic mulch laying machine of the invention and illustrating, by broken lines, a varying position of the plastic hold down wheels thereof.

The roll 32 is engaged by a hold down arm 34 shown best in FIGS. 1 and 2 of the drawings. This hold down arm 34 is provided with an adjustable weight 36 carried by an arm 38 which is pivoted at 40 on a tool post engaging member 42 near the point 12 of the plow blade structure of the invention.

The hold down arm 34 holds the plastic 44 taut as it is pulled from the roll 32. This plastic 44 is extended downwardly and under plastic hold down wheels 46 and 48, as will be hereinafter described in detail. These wheels 46 and 48 operate below the roll of plastic 32 and are supported on spring loaded struts 50 and 52, respectively. These spring loaded struts are similar and therefore reference is made to FIG. 5 disclosing details of the spring loaded strut 50. This strut 50 is provided with an upper cylinder 54 having a bracket 56 stationarily secured by welding or otherwise to the blade portion 14 of the plow of the invention.

Positioned in this cylinder 54 is a spring 58 acting compressively downward to impose a downward force on a cylinder 60 which is telescopically mounted in the cylinder 54. A tie rod 62 holds the cylinders together at a maximum extension of the cylinder 60 relative to the cylinder 54 and an axle 64 extends laterally in connection with each lower cylinder 60 of the strut assemblies 50 and 52. This axle 64 carries both the wheels 46 and 48 which operate as plastic strip hold down rollers, as will be hereinafter described.

The wheels 46 and 48, as shown in FIG. 3 of the drawings, bear upon a strip of plastic lying on the upper surface A of a plant row of soil and tend to pull the plastic laterally in directions of arrows B and C to pull it tight over the upper surface of the soil whereupon discs 66 and 68, following the plow which moves in the direction of an arrow D, in FIG. 1 of the drawings, cover opposite edges of the plastic strip after it has been pulled tight by means of the wheels 46 and 48 acting resiliently as hold down rollers. It will be understood that these springs 58 in the struts 50 and 52 provide the downward force to cause the wheels 46 and 48 to pull the plastic tight over the convex surface, as indicated at A in FIG. 3 of the drawings. Thus, as the discs 66 and 68 cover opposite edges of the plastic, it is then held securely in an intimate position relative to the upper convex surface of the plant row of soil.

It will be understood that the plow structure comprising the blades 14 and 16 is provided with a very slight curvature tending to create a minimum of lift of the soil and mere lateral displacement so that the plow places a substantial amount of soil, as indicated at E, in the way of the discs 66 so that they may follow and plow it back onto opposite edges of the plastic strip for holding this strip down and retaining it intimately engaged with the convex surface of the plant row.

Referring to FIG. 4 of the drawings, it will be seen that the wheels 46 and 48 are mounted on the axle 64, as shown in FIG. 3 of the drawings. However, a flexible bag 70 is rotatably mounted on the shaft 64. This bag is provided with a central sleeve 72 which is hermetically sealed to the bag 70 and the bag 70 may be filled with liquid 74 or lead shot, if desired. The flexible bag may be made of plastic or other suitable material and thus, rolls on the surface of the ground tending to force the strip of plastic from the roll 32 into contiguous relationship with the upper surface of the ground while the wheels 46 and 48 tend to stretch the plastic over the convex surface of the plant row of soil, all as hereinbefore described.

It will be seen that the discs 66 and 68 are mounted on conventional rearwardly extending bars 76 and 78, as shown best in FIGS. 1 and 2 of the drawings. These discs may be vertically adjusted in the conventional manner by means of set screws 80 in a sleeve 82 carried by one of the arms 76 or 78 and that the strut 84 of the disc 68 may be vertically adjusted in the sleeve 82 and fixed in position by the screws 80.

The entire assembly of the plastic mulch laying machine of the invention may be carried by three upwardly extending posts 42, 86 and 88, all as shown best in FIGS. 1, 2, and 3 of the drawings.

The method of the present invention comprises the steps of plowing a convex surface longitudinally of a plant row of soil so that the convex surface curves outwardly and downwardly from the high point at the middle of the plant row of soil toward opposite sides and adjacent furrows. Then plastic material is progressively laid longitudinally of the plant row of soil so that opposite edges of the plastic strip are disposed outwardly and downwardly of the middle of the strip. Then vertically spring loaded rollers roll upon said plastic strip near opposite edges thereof at opposite sides of the middle portion thereof to force the plastic into contiguous intimate contact with the upper convex surface of the plant row of soil and then discs or plows follow the hold down wheels and plow dirt over opposite edges of the plastic thereby to hold it in position in contiguous relationship with the upper convex surface of the soil.

With the piercing of the plastic and the planting of the seed in the soil below the pierced opening in the plastic material whereupon as the seed germinates and grows, it passes directly upward through the surface of the soil and the plastic at the same time and is thus, readily emerged through the opening initially pierced when the seed is planted.

It will be obvious to those skilled in the art that when plastic is supported above the surface of the ground, that the hot air below the plastic and above the soil may kill a plant as it grows from the soil upwardly to the opening in the plastic. Furthermore, it will be appreciated that in some instances, the plant may not grow directly toward the opening and thus, be partially trapped and burned, due to hot sunny weather which will raise the temperature below the plastic to a very high degree.

It will be obvious to those skilled in the art that various modifications of the present invention may be resorted to in a manner limited only by a just interpretation of the following claims.

We claim:

1. In a plastic mulch laying machine the combination of: means to form a convex surface of soil on the upper surface of a plant row such that said surface slopes outwardly and downwardly from the middle portion of the row; means for dispensing a plastic strip on said convex surface; means for exerting downward pressure on said plastic strip to force it into contiguous intimate contact with said convex surface of said soil; and means following said last mentioned means disposed to plow soil over opposite edges of said plastic to thereby maintain it in intimate contact with said convex surface of said soil; said means for exerting downward pressure on said plastic strip comprising a flexible bag rotatably mounted and disposed to be ground driven, said flexible bag disposed to roll upon plastic laid on said convex surface and thereby to force said plastic into intimate contact with said convex surface of said soil.

2. In a plastic mulch laying machine the combination of: a substantially V-shaped plow having a forwardly directed pointed portion and backwardly diverging plate portions; lower edges of said plate portions sloping outwardly and downwardly from the forwardly pointed portion of said plow thereby disposed to provide a convex surface or a surface having a high point in the middle of a plant row of soil and sloping from the middle downwardly and outwardly toward furrows at opposite sides thereof; means following said plow for dispensing a strip of plastic on said plant row of soil comprising means for holding a roller containing a strip of plastic material; wheels carried by said plow and bearing down to engage said plastic strip at opposite sides of the middle portion thereof and to hold it down on top of said convex surface formed by said plow to thereby draw the plastic taut over the middle portion of said plant row of soil; and means carried rearwardly at opposite sides of said plow disposed to plow soil onto opposite edges of said plastic material following said wheels.

3. In a plastic mulch laying machine the combination of: a substantially V-shaped plow having a forwardly directed pointed portion and backwardly diverging plant portions; lower edges of said plate portions sloping outwardly and downwardly from the forwardly pointed portion of said plow thereby disposed to provide a convex surface or a surface having a high point in the middle of a plant row of soil and sloping from the middle downwardly and outwardly toward furrows at opposite sides thereof; means following said plow for dispensing a strip of plastic on said plant row of soil comprising means for holding a roller containing a strip of plastic material; wheels carried by said plow and bearing down to engage said plastic strip at opposite sides of the middle portion thereof and to hold it down on top of said convex surface formed by said plow to thereby draw the plastic taut over the middle portion of said plant row of soil; and means carried rearwardly at opposite sides of said plow disposed to plow soil onto opposite edges of said plastic material following said wheels; means frictionally engaging said roll of plastic material to maintain it taut; and spring loaded struts tending to force said wheels downwardly into engagement with said plastic to hold it frictionally on said ground so that when said plow is drawn forwardly at its pointed end, said plastic in frictional engagement with said soil and held down by said wheels will be dispensed longitudinally of said row whereby subsequent plowing of soil onto opposite edges thereof will fix said plastic strip in intimate contact with the middle portion of said plant row of soil.

4. In a plastic mulch laying machine the combination of: a substantially V-shaped plow having a forwardly directed pointed portion and backwardly diverging plate portions; lower edges of said plate portions sloping outwardly and downwardly from the forwardly pointed portion of said plow thereby disposed to provide a convex surface or a surface having a high point in the middle of a plant row of soil and sloping from the middle downwardly and outwardly toward furrows at opposite sides thereof, means for dispensing a plastic strip on said convex surface, rolling means for exerting downward pressure on said plastic strip to force it into contiguous intimate contact with said convex surface of said soil; and means carried rearwardly at opposite sides of said plow disposed to plow soil onto opposite edges of said plastic material thereby maintaining said plastic material in intimate contact with said convex surface of said soil.

References Cited by the Examiner
UNITED STATES PATENTS

| 103,289 | 5/70 | Bogart | 111—15 |
| 375,081 | 12/87 | Lynch | 111—83 |
| 2,890,665 | 6/59 | Kang | 111—3 |
| 2,975,842 | 3/61 | Mostrong | 172—252 |

FOREIGN PATENTS

| 105,875 | 11/38 | Australia. |

ABRAHAM G. STONE, *Primary Examiner.*

UNITED STATES PATENT OFFICE
CERTIFICATE OF CORRECTION

Patent No. 3,184,889                               May 25, 1965

Charles E. Gray et al.

It is hereby certified that error appears in the above numbered patent requiring correction and that the said Letters Patent should read as corrected below.

Column 5, line 12, for "plant" read -- plate --.

Signed and sealed this 21st day of December 1965.

(SEAL)
Attest:

ERNEST W. SWIDER                                    EDWARD J. BRENNER
Attesting Officer                                        Commissioner of Patents